May 26, 1931.  J. H. TREECE  1,807,095
GLASSWARE FORMING MACHINE
Filed Jan. 16, 1930
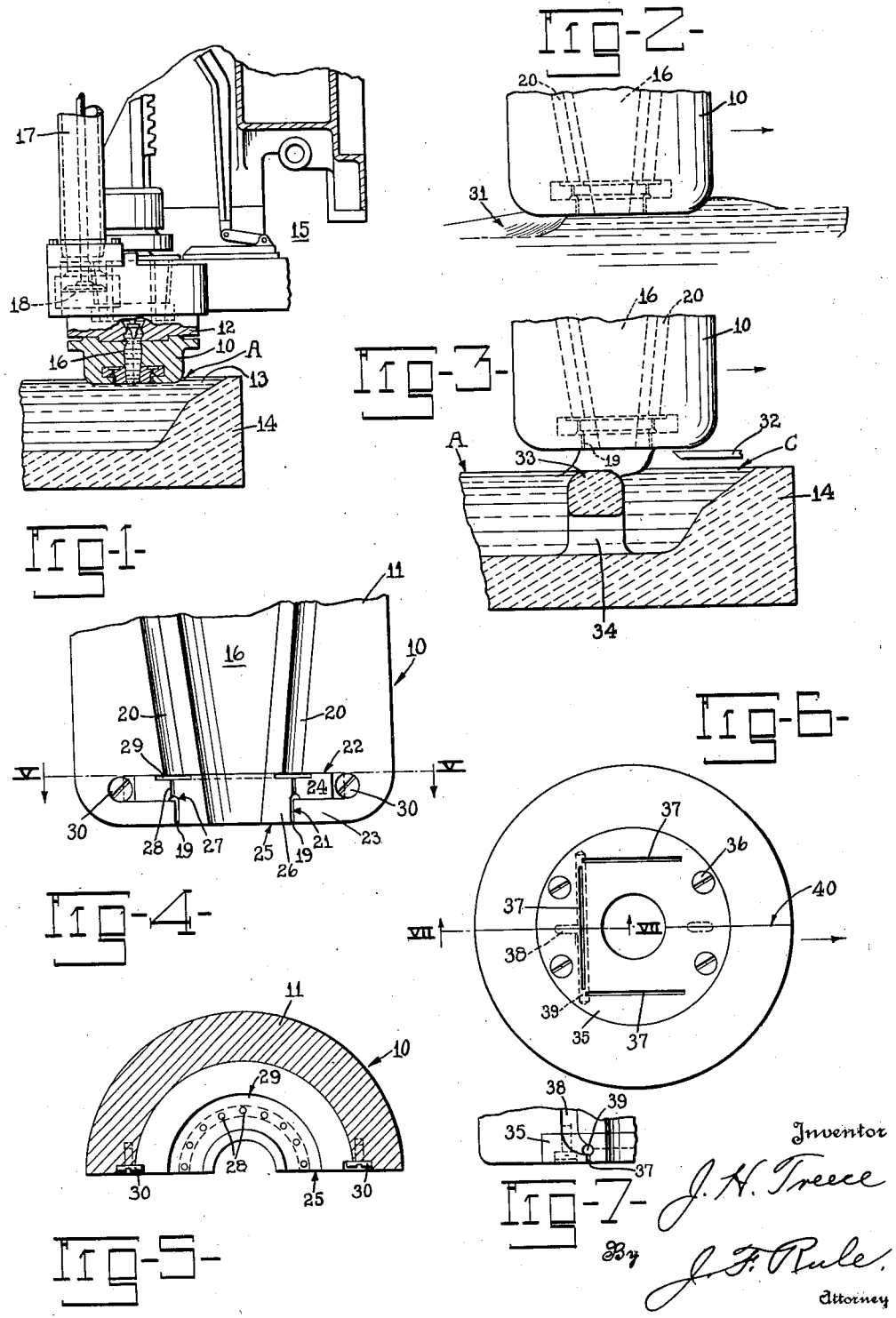

Patented May 26, 1931

1,807,095

UNITED STATES PATENT OFFICE

JESSE H. TREECE, OF TOLEDO, OHIO, ASSIGNOR TO OWENS-ILLINOIS GLASS COMPANY, A CORPORATION OF OHIO

GLASSWARE FORMING MACHINE

Application filed January 16, 1930. Serial No. 421,143.

The present invention relates to improvements in glassware forming machines, and particularly to the blank molds in which blown articles of glassware are given their initial form.

In some types of commercial glassware forming machines, mold charges of molten glass are gathered into blank molds by suction, the molds being mounted for movement in succession in contact with a supply body of molten glass. Air is exhausted from the mold cavities after sealing contact between the molds and glass has been effected, so that mold charges are delivered to said cavities. These mold charges are then transformed into blanks or parisons which are later transferred to finishing molds for final shaping. Due to continuous movement of a blank mold while projecting into the glass, a wake or trough is formed in the surface of the glass immediately behind the molds so that in many instances the seal at one side of the entrance to the mold cavity is broken. This results in incomplete filling of the mold cavity and production of articles of glassware below standard weight and, for this and other reasons, incapable of meeting the usual requirements for quality glassware.

An object of the present invention is the provision of means employing vacuum or suction to avoid breaking the seal between the inlet to or mouth of the mold cavities and the supply body of molten glass from which mold charges are obtained. To this end, a vacuum slot is provided in the lower end of the blank or gathering mold in such position with respect to the inlet of the mold cavity that irrespective of the depth of the wake or trough formed by movement of the mold through the glass, a perfect seal will be maintained throughout the mold charging operation so that complete filling of the mold cavity is assured.

Another object is the provision of vacuum means for preventing premature return to the main supply body of molten glass, of the excess glass which ordinarily depends from the mold charges in the molds as they are lifted away from the supply body. This excess glass is ordinarily chilled to a certain extent due to segregation from the main supply body of hot glass when the mold is removed out of contact with said supply body. Contact with the cutoff knife which severs the mold charge from the excess glass additionally chills the latter. Accordingly, it is of considerable advantage to be able to deposit this excess chilled glass entirely outside the area from which the next succeeding mold charge will be gathered. By applying vacuum to the lower end of the mold cavity entirely around the entrance to the mold cavity, as provided for in my invention, the excess glass can be carried well beyond the gathering area before it is severed from the gathered mold charge and returned to the main supply body.

Other objects will be in part apparent and in part pointed out hereinafter.

In the drawings:

Fig. 1 is a sectional elevation illustrating the invention embodied in a blank mold shown in charge gathering position.

Fig. 2 is a fragmentary detail elevation showing a gathering or blank mold in charge gathering position, said mold embodying the present invention.

Fig. 3 is a view similar to Fig. 2 showing the mold in proximity to the charge severing or cutoff position.

Fig. 4 is a fragmentary elevation of the sealing surface of one section of the mold showing the improved construction.

Fig. 5 is a sectional elevation taken along the line V—V of Fig. 4.

Fig. 6 is a bottom plan view of another form of the invention.

Fig. 7 is a fragmentary detail taken substantially along the line VII—VII of Fig. 6.

In the accompanying drawings, Figs. 1 to 5, inclusive, illustrate one embodiment of my invention. The charge gathering or blank mold 10 with which my invention is associated includes a pair of cooperating separable mold sections 11 adapted to close about a neck mold 12 just prior to being moved into charge gathering contact with the supply body of molten glass 13 in the container 14. These blank and neck molds 10 and 12 comprise part of a head 15, of which there may be an annular series moving continuously or intermittently in a closed path so that they are moved in succession across and in contact with the surface of said supply body of molten glass 13. A mold cavity 16 extends lengthwise through the blank and neck molds 10 and 12, opening through the lower end of the former so that when said lower end contacts with the supply body of glass and air is exhausted from said cavity, a mold charge will be drawn into the latter. Vacuum is applied to these cavities through a pipe 17 and controlled by a valve 18. Suitable means (not shown) is employed to alternately raise and lower the molds and certain parts immediately connected thereto to effect contact between the molds and glass. The mechanism (not shown) for controlling various movements of the blank and neck molds may well be such as that disclosed in Patent 1,641,497 granted to R. LaFrance September 6, 1927, entitled "Machine for Forming Glass Articles", to which patent reference may be had for additional details.

In order to maintain a perfect seal between the inlet or mouth of the mold cavity 16 and the supply body of glass 13 so that complete filling of said cavity may be obtained with each charge gathering operation, vacuum is employed to cause momentary adhesion of portions of the supply body of glass to a predetermined area of the mold bottom in proximity to and either partially or completely extending around the inlet to the cavity. This is accomplished, in the form shown in Figs. 1 to 5 inclusive, by providing a vacuum slot 19 opening through the lower end of each of the two mold sections, said slots cooperating when the mold is closed, to form a circular way concentric to the mold cavity 16. The vacuum slot or way 19 communicates with the usual vacuum grooves 20 in the meeting faces of the mold sections 11, said grooves 20 in turn being connected to a source of vacuum supply, as taught in the patent referred to heretofore or in any other preferred manner. The vacuum slot 19 is formed by providing in the lower end of each section 11 of the mold a semicircular recess 21, the upper end of which opens into a semicircular channel 22 disposed in a plane radially outward from said recess. Thus, there is formed a shoulder 23 which engages the lower side of a radial flange 24 forming part of the insert 25 and supports the latter. This insert includes a semicircular body portion 26 of sufficiently less diameter than the recess 21 to provide the vertical vacuum slot 19. This vacuum slot 19 communicates through a groove 27 or channel with a plurality of vertical openings 28 leading to a semicircular recess 29 or way in the upper side of the insert, said recess 29 communicating directly with the usual vacuum grooves 20. Screws 30 separably connect the inserts 25 and mold sections 11 as shown in Figs. 4 and 5.

In operation, the blank mold, while gathering a mold charge of molten glass from the supply body 13 and moving in the direction of the arrows in Figs. 2 and 3, tends to pile up the glass on its forward side while creating a wake or trough 31 rearwardly thereof. Ordinarily the creation of this wake or trough tends to break the seal between the rear portion of the inlet or mouth of the mold cavity 16 so that frequently the mold cavity is only partially filled with molten glass. With the construction illustrated herein, vacuum, when applied to the mold cavity 16 and usual vacuum grooves 20 is also applied to the vacuum slot 19 so that a sufficient quantity of glass is held in contact with areas of the mold bottom in proximity to and about the entrance to the cavity to insure such seal between the glass and mold, that the cavity is completely filled and, as a result, forms a standard size parison. Further, by maintaining application of vacuum to the mold cavity until after the mold charge has been severed from the supply body by a cutoff knife 32 as is customary, chilled portions of glass are completely removed from the gathering area "A" and deposited in a cutoff receiving area "C". If desired, these areas may be separated by a dam 33 which is provided with submerged return openings 34 through which the severed portions of glass return to the main supply body for reheating and re-assimilation. Thus, application of vacuum serves a twofold purpose in that it prevents breaking the seal between the mold and supply body of glass during the actual charge gathering operation and later operates effectively as a means for completely removing a portion of the chilled glass to an area separate from that from which the mold charges are gathered. Application of vacuum to the mold may be discontinued when the mold reaches approximately the position shown in Fig. 3 so that the glass pulls away from the mold and leaves a relatively thin thread through which the knife 32 must cut to remove the excess glass.

In Figs. 6 and 7, a slightly modified form is shown wherein one-half of an insert 35 is secured by screw fasteners 36 to the bottom end of each mold section, said insert having vacuum slots 37 formed therein. These vacuum slots 37 communicate with one of the vacuum grooves 38 through passageways 39, the latter preferably formed at right angles to the meeting faces 40 of the mold sections and opening at one end through said faces. These vacuum slots 37 are so formed and positioned with respect to each other that when the mold is closed they assume a U formation with the open end facing the direction of travel of the mold during the mold charging operation. Thus, these slots when vacuumized prevent the glass from pulling away at the rear side of the entrance to the mold cavity and in this respect perform the same function as that form of mold shown in Figs. 1 to 5 inclusive.

In machines of the type with which my invention may be used, the gathering or blank molds may open in either of two well known fashions. One type of mold comprises two sections whose vertical meeting faces extend along a radial line from the center of the machine and consequently open by a relative movement of the sections along a line tangent to the path of travel. Under such conditions, the vacuum slots 37 (Fig. 6) would be disposed in a position wherein the open end of the U extended at right angles to the showing in said figure. In the form illustrated, the molds are intended to open by a movement of the two sections along a path extending radially of the machine.

Modifications may be resorted to within the spirit and scope of the appended claims.

What I claim is:

1. In a glass forming apparatus, the combination of a suction gathering mold, means for causing it to travel in contact with a supply body of molten glass to permit a charge of glass to be introduced by suction into the mold, and means for applying suction to an area of the mold bottom for maintaining the glass in sealing contact with the mouth of the mold.

2. In a glass forming apparatus, the combination of a mold for gathering glass by suction, and suction means for maintaining the glass in sealing contact with at least a portion of the mold bottom in proximity to the mouth of the mold.

3. In glass forming apparatus, a suction gathering mold having a cavity opening through its lower end, means for projecting the open lower end of the mold into a supply body of molten glass and moving the mold in a substantially horizontal plane through the glass, suction means for drawing a mold charge into the cavity, and suction means including a vacuum slot extending at least partially around the cavity and opening through the lower end of the mold to maintain sealing contact between the glass and mouth of the mold cavity.

4. In a glass forming machine, a gathering mold having a cavity opening through its lower end and a vacuum slot at least partially encircling the cavity and opening through said lower end, and means for exhausting air from the cavity and slot.

5. In a glass forming machine, a gathering mold having a cavity opening through its lower end and a vacuum slot encircling the cavity and opening through said end, means for moving the mold past a charge gathering position with its lower end dipping into a supply body of molten glass, and means for exhausting air from the cavity and slot to thereby fill the cavity with molten glass and maintain sealing contact between the glass and mouth of the mold cavity.

6. In a glass forming machine, a gathering mold having a cavity opening through its lower end and a vacuum slot encircling the cavity and opening through said end, means for moving the mold past a charge gathering position with its lower end dipping into a supply body of molten glass, and means common to the cavity and slot to exhaust air therefrom to thereby fill the cavity with molten glass and maintain sealing contact between the glass and mouth of the mold.

7. In a glass forming apparatus, the combination of a mold for gathering glass by suction, said mold having a cavity opening through its lower end and a vacuum slot opening through said end adjacent the cavity, and means for exhausting air from the cavity and slot.

8. In a glass forming apparatus, a suction gathering mold having a cavity opening through its lower end, said mold formed with a radially extending channel opening into the cavity and thereby providing an inwardly projecting shoulder, an insert supported on the shoulder, said insert forming with a part of said shoulder a vacuum slot opening through the lower end of the mold, and means for applying vacuum to the cavity and said slot.

9. The method which consists in causing a mold to traverse the surface of a supply body of molten glass, applying suction within the mold to the mold and a portion of the lower end thereof to fill said mold with glass and maintain sealing contact between the supply body of glass and mouth of the mold, lifting the mold out of contact with the supply body while maintaining application of vacuum to the cavity and bottom of the mold, discontinuing application of vacuum after the mold has been lifted and prior to moving beyond said supply body, and severing excess glass from the lower end of the mold.

10. The combination of a suction gathering mold open at one end to receive a charge of glass, said mold formed with a narrow slot in said end of the mold separate from and extending along said cavity and sufficiently restricted to prevent the entry of glass, and means for applying suction through said slot.

11. The combination of a mold open at one end to receive a charge of glass, means for exhausting the air from the mold when said end is brought into contact with a supply body of glass and thereby cause the mold to receive a charge of glass by suction, and pneumatic means acting at said end of the mold on a localized area surrounding and separated from the mold cavity for maintaining a sealing contact between said end of the mold and the supply body of glass.

Signed at Toledo, Ohio, this 14th day of January, 1930.

JESSE H. TREECE.